United States Patent
Grillo et al.

(10) Patent No.: US 9,886,269 B2
(45) Date of Patent: Feb. 6, 2018

(54) SYSTEMS AND METHODS FOR ENFORCING CODE REVIEWS

(71) Applicant: Microsoft Technology Licensing, LLC, Redmond, WA (US)

(72) Inventors: Daniel L. Grillo, Emerald Hills, CA (US); Stephen Holsapple, Mountain View, CA (US); David McCutcheon, San Jose, CA (US); Dustin Kwong, San Francisco, CA (US); Jens Pillgram-Larsen, Pleasanton, CA (US); Jarek Rudzinski, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/054,981

(22) Filed: Feb. 26, 2016

(65) Prior Publication Data
US 2016/0179505 A1   Jun. 23, 2016

Related U.S. Application Data

(63) Continuation of application No. 14/160,935, filed on Jan. 22, 2014, now Pat. No. 9,311,076.

(51) Int. Cl.
*G06F 9/44* (2006.01)
*H04L 29/08* (2006.01)
*G06F 17/30* (2006.01)

(52) U.S. Cl.
CPC ............... *G06F 8/70* (2013.01); *G06F 8/71* (2013.01); *G06F 17/30106* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 7,904,802 B1 * | 3/2011 | Kolawa | G06Q 10/06 705/300 |
| 9,311,076 B2 | 4/2016 | Grillo et al. | |
| 2007/0061782 A1 * | 3/2007 | Schreiner | G06F 11/3688 717/124 |

(Continued)

OTHER PUBLICATIONS

"Day-to-day with Subversion", author unknown, internet article, May 7, 2008.*

(Continued)

*Primary Examiner* — Daxin Wu
(74) *Attorney, Agent, or Firm* — Schwegman Lundberg & Woessner, P.A.

(57) ABSTRACT

Techniques for enforcing software reviews are described. For example, a machine receives a commit request to commit code to a repository. The machine, in response to the receiving of the commit request, determines a directory that is a destination of the code. The machine identifies, based on the directory, an ownership file that includes an identifier of an owner who controls committing of code to the directory. The machine determines, based on the ownership file, that the owner did not provide an indication of approval of the code requested to be committed to the repository. The machine facilitates, based on the determination that the owner did not provide the indication of approval, a review of the code by the owner.

20 Claims, 7 Drawing Sheets

(56) References Cited

U.S. PATENT DOCUMENTS

| | | | |
|---|---|---|---|
| 2008/0059977 A1* | 3/2008 | Brown | G06F 8/71 |
| | | | 719/316 |
| 2009/0055809 A1* | 2/2009 | Campbell | G06F 8/36 |
| | | | 717/140 |
| 2011/0314439 A1 | 12/2011 | Colgrave et al. | |
| 2012/0204143 A1 | 8/2012 | Fox et al. | |
| 2012/0204151 A1* | 8/2012 | Ientile | G06F 8/71 |
| | | | 717/121 |
| 2014/0196010 A1* | 7/2014 | Balachandran | G06F 8/71 |
| | | | 717/124 |
| 2015/0100940 A1* | 4/2015 | Mockus | G06F 8/70 |
| | | | 717/101 |
| 2015/0205600 A1 | 7/2015 | Grillo et al. | |

OTHER PUBLICATIONS

"U.S. Appl. No. 14/160,935, Final Office Action dated Oct. 23, 2015", 8 pgs.
"U.S. Appl. No. 14/160,935, Non Final Office Action dated May 1, 2015", 28 pgs.
"U.S. Appl. No. 14/160,935, Notice of Allowance dated Nov. 30, 2015", 10 pgs.
"U.S. Appl. No. 14/160,935, Response filed Sep. 1, 2015 to Non Final Office Action dated May 1, 2015", 14 pgs.
"U.S. Appl. No. 14/160,935, Response filed Nov. 2, 2015 to Final Office Action dated Oct. 23, 2015", 11 pgs.
"Day-to-day with Subversion", [Online]. Retrieved from the Internet: http:weblogs.asp.netbsimserday-to-day-with-subversion, (May 7, 2008).

\* cited by examiner

SYSTEMS AND METHODS FOR ENFORCING CODE REVIEWS

CLAIM OF PRIORITY

This application is a continuation of and claims the benefit of priority under 35 U.S.C. §120 to U.S. patent application Ser. No. 14/160,935, entitled "SYSTEMS AND METHODS FOR ENFORCING CODE REVIEWS," filed on Jan. 22, 2014, which is hereby incorporated by reference herein in its entirety.

TECHNICAL FIELD

The present disclosure generally relates to data processing systems. More specifically, the present disclosure relates to methods, systems, and computer program products for categorizing exceptions and logs.

BACKGROUND

Sometimes, in its early days, a company may implement few, if any, access control rules for managing access to a file repository. Engineers working at such a company may encounter no restrictions in making changes to files located in the file repository. Consequently, software code changes that are not reviewed by another engineer may result in more failures than peer-reviewed software code changes.

DESCRIPTION OF THE DRAWINGS

Some embodiments are illustrated by way of example and not limitation in the FIGs. of the accompanying drawings, in which.

DETAILED DESCRIPTION

Figure 1:
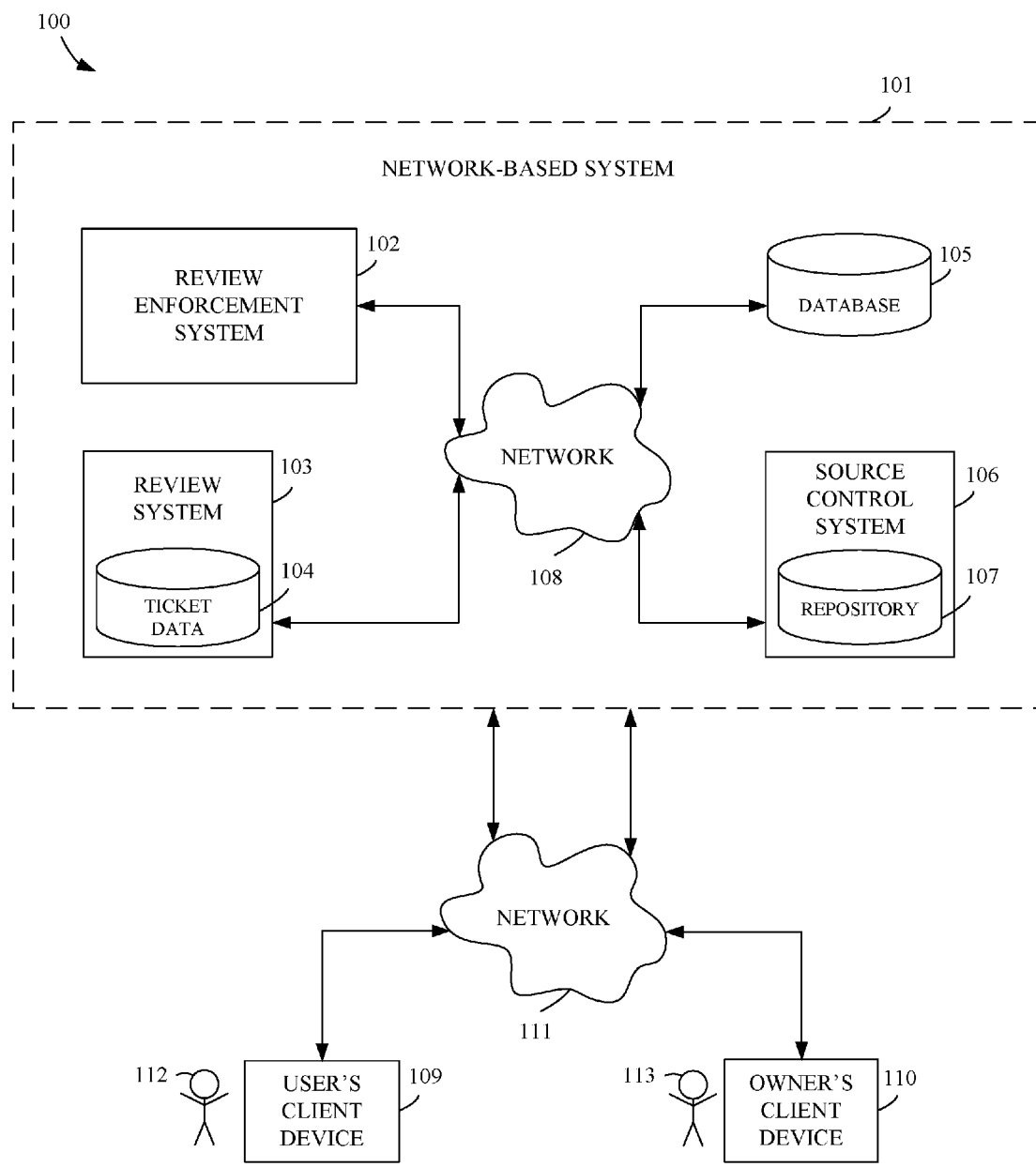
FIG. 1 is a network diagram depicting an example network environment, within which various example embodiments of a review enforcement system may be deployed.

The present disclosure describes methods, systems, and computer program products for enforcing code reviews. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

In software development, a computer-implemented product (or a "computing application") may undergo revisions. A revision may include, for example, new features added to the computer-implemented product or changes to the software to fix bugs in the computer-implemented product. A revision may change one or more components (e.g., source code) of the computer-implemented product. The computer-implemented product may, for example, be a web service or a collection of web services.

Once a software developer completes a change to a component of the computer-implemented product (e.g., a change to a source code module), the software developer may transfer the change to a code repository. The change to the code (e.g., the differences between a later version of a source code module and a former version of the source code module) may be transmitted to the code repository by itself or as part of a file.

The process of transferring the change (or the changed code) to a code repository may be termed a check-in (or "commitment") process. The check-in process may start with a request to check in (or "commit") a code module to a code repository. In some example embodiments, preliminary tests with respect to the code module are performed. The code module may be assigned a version number (or "revision identifier") and may be stored in the source code repository. After the code module is checked into a source code repository, the code module may be incorporated into the computer-implemented product by a build process. The resulting product may undergo further testing. Upon successful completion of the testing, the computer-implemented product may be released to the public.

Traditionally, companies may release computer-implemented products on fixed release dates. Sometimes strict release dates may not allow the developers sufficient time to fully address the problems (e.g., fix bugs) discovered during the pre-release testing of the software code. In order to meet release deadlines, patches to the code may be applied without being fully testing. In contrast, a company that employs a model of continuous delivery of software may deliver new product features and capabilities quicker and more reliably.

Continuous delivery allows a company to deliver software code or software code changes several times a day. Unlike the fixed release date model, which may postpone addressing a failure until a pre-determined period (e.g., a code freeze period) begins, the continuous delivery model resolves (e.g., determines and addresses the cause of) a failure as soon as it happens to determine whether the code is releasable. Because in a continuous delivery environment code may be released at any time, the use of a branch-based development model (where development of the components of a computer-implemented product happens on different branches) may prove impractical. In some example embodiments, a trunk-based development model is used to allow the developers to check software into a shared line of development (e.g., a directory) of the repository in a source control system (or "revision control system", or "version control system"). The shared line of development is colloquially known as "trunk" or "mainline". The developers may not be allowed to commit code to branches of the repository and may be requested to commit code only to the trunk directory of the repository.

Based on numerous developers checking code into the trunk, the trunk may become susceptible to an increased number of errors (e.g., user mistakes, failures, bugs, etc.)

When an error occurs on the trunk, the trunk may be locked. For example, a failure of a test performed after certain code is committed to the trunk may cause the trunk to be locked, thus, preventing any further code check-ins. The only change that may be checked in is a change that resolves a particular failure. By preventing further changes from being added to code located in the trunk, a continuous delivery system that uses trunk-based development may prevent additional failures from occurring. This may simplify the task of resolving the particular failure. In certain example embodiments, the continuous delivery system may request that a first person reviews a code change made by a second person before the code change may be committed to the repository.

The subject matter described herein may allow a review enforcement system to enforce code "ownership" and the reviewing of code by an "owner" of the code before it is committed to a repository. For purposes of the present disclosure, the term "owner" means a person (e.g., a software developer) who controls the committing of code (e.g., a unit of code, a segment of code, a section of code, etc.) to a particular location (e.g., a directory) in a repository of files. For purposes of the present disclosure, the code that a developer (also referred to herein as a "user") requests to be committed to a repository may be, for example, a difference (e.g., the output of a duff command or, colloquially, a "diff") between a first file and a second file, a difference between a previous version of one or more files located in the repository and a later version of the one or more files that includes one or more changes made to the previous version, a file (or an "upload file") that is a diff, a file that includes a diff (e.g., a later version of the code, including the code modification), etc. In some example embodiments, a request to commit code to the repository may specify that a plurality of diffs be checked into the repository. The multiple diffs may, in some instances, be included in an upload file referenced in the commit request.

The code that the user requests to be committed to the repository may or may not include a change to an existing file located in the repository. For example, the user may request to commit a new upload file rather than a revision of an existing upload file located in the directory. The owner may control the checking of code into a directory by reviewing the code and determining whether the code is ready to be committed or should undergo further revision (e.g., by the user or a third party). Upon reviewing the code, the owner may determine whether to approve the code to be committed to the repository or whether to request that the user modify the code.

In some example embodiments, the review enforcement system receives a request (also referred to herein as a "check-in request", a "commit request" or a "commit command") to commit code to the repository. The commit request may reference the code or may include the code. In some instances, the commit request is received from a client device associated with a user. Using ownership data that identifies an owner who controls committing of code to a directory, the review enforcement system determines whether the owner did or did not provide an indication of approval of the code to be committed to the repository. Based on a determination that the owner did not provide the indication of approval, the review enforcement system facilitates a review of the code by the owner.

In certain example embodiments, each project has its own directory in the repository. Further, each directory may include a configuration file (also referred to herein as an "ownership file") that includes the ownership data for the particular project. The ownership file may specify one or more owners and one or more paths (e.g., directories or sub-directories) guarded by the owners.

Upon receiving the commit request, the review enforcement system may determine, based on the ownership file or the commit request (e.g., the name of the file in the commit request), or both, that a particular guarded directory is the destination of the code referenced (or included) in the commit request. If the review enforcement system determines that an owner guarding the directory reviewed and approved the code to be committed to the repository, the review enforcement system commits the code to the directory. If the review enforcement system determines that an owner did not review or approve the code, the review enforcement system may transmit a communication to the user, the owner, or both, requesting a review of the code as a pre-requisite to checking the code into the repository.

In response to receiving a request to review the code, an owner may review the code and may determine that the code may require modification by the user. A communication may be sent to the user in which the user is requested to modify the code. The communication may also include feedback (e.g., from the owner) that pertains to the code. The user may modify the code and may issue a new commit request. In certain example embodiments, the review enforcement system tracks the changes made to the code by the user.

The review enforcement system also may validate (e.g., confirm) that the code which the user attempts to commit is indeed code that reflects the changes made by the user based on the feedback received from the owner. According to some example embodiments, the review enforcement system verifies that the code requested by the user to be committed to the repository is the same code that the owner reviewed and approved based on matching the code requested to be committed and the code that was reviewed and approved by the owner.

In certain example embodiments, during the review process, a conversation may exist among the owner reviewing the code, the developer requesting the code check-in and/or one or more other developers or owners. As a result of the conversation, there may be a number of revisions of one or more diffs, certain files may be added or removed, etc. In some instances, a ticket may be opened and used to track the conversation among the different actors involved in the review of the code, the actions taken during the review process, the additions or removals of files, the resulting changes to the code, etc. Based on verifying that approval for check-in has been granted by the owner, the review enforcement system may generate a union of a plurality of diffs (e.g., different versions of diffs) that include a number of changes that were made during the review process to be committed to the repository. The union of diffs may be committed to the destination directory.

In some example embodiments, the review enforcement system verifies that only the files (or the diffs) approved for check-in by the owner are checked into the repository. In certain example embodiments, if the user adds to the check-in request a new file that the owner has not reviewed, the system review enforcement rejects the check-in request. For example, if a user gets approval to check in file X1 and file X2 but attempts to check in file X1, file X2, and file X3 (or file X1 and file X3), the review enforcement system determines that the check-in request refers to (or includes) an unapproved file and rejects the check-in request. Similarly, in some example embodiments, if the owner approved a set of files to be checked in, but the user only attempts to check in a subset of the set of approved files, the review enforcement system rejects the check-in request.

According to some example embodiments, the review enforcement system validates that the proper owner(s) approved the code. When a developer attempts to check in a number of changes that affect code in different directories that are guarded by different owners, the review enforcement system validates that each change is reviewed and approved by an owner who is authorized to approve changes to the files in the particular directory. For example, if the developer obtained reviews for a first subset of a plurality of files but attempts to check in a second subset of the plurality of files that includes an unreviewed file, the review enforcement system rejects the check-in request.

Consistent with some example embodiments, updates to the code that include modifications requested by a reviewer may or may not receive a final review (and/or approval) by the owner. In some example embodiments, the review enforcement system allows a user to modify an approved diff (or an approved upload file) after the code was approved by an owner. In some instances, the user may make changes to the diff (or the upload file) that do not structurally change the code (e.g., add comments). In various example embodiments, the review enforcement system does not allow a user to modify the content of a file after it was approved for checking in. As a result, only the content approved may be committed. In certain example embodiments, the review enforcement system checks in the reviewed and approved code directly from the review system upon receiving an indication of approval from the owner. In other example embodiments, the review enforcement system checks in the reviewed and approved code upon receiving a new commit request from the developer or the owner.

In some example embodiments, users may be given the ability to bypass the review enforcement system's requirement to have a change reviewed and approved by an owner. The review enforcement system may use an audit mechanism to track the actions taken or changes made by a user. For example, a computer-implemented product exhibits a serious issue that affects revenue generation. To resolve the issue, a user may be allowed to commit a change to the code of the computer-implemented product as soon as possible without first obtaining a review and approval by the owner. The committing of a change without a prior approval from the owner may trigger an audit trail to collect data that pertains to the unapproved check-in. The audit trail may serve to inform certain persons in the organization that an exception to (or an override of) the code review requirement has occurred. The audit trail is dynamic and allows the review enforcement system to track when such exceptions occur, to identify which user checked code into the repository without approval, to monitor the user's activity with respect to the particular code change, to alert the owner(s) guarding the destination path for the code change, to determine whether the unapproved check-in caused an adverse effect later, etc. In some example embodiments, any developer is allowed to make a bypass change. In other example embodiments, only members of a particular group of users (e.g., certain developers or administrators) may be allowed to make a bypass change. An authentication of the member of the particular group of users may be required to authenticate before being allowed to bypass the system and commit a code change.

In some example embodiments, a keyword may be used in the commit message associated with the commit request to initiate an audit trail. In some instances, the user may specify in the message the reason for the use of the override. The audit trail may include one or more email messages, one or more logs or log files, a link to a user interface (e.g., a review board) that presents information that pertains to the code change, as well as the commit message that gives additional details pertaining to the reason why the developer used the override. The audit trail may be accessed (e.g., transmitted to) one or more owners guarding the path to which the code change was committed by the user.

According to certain example embodiments, certain users may be allowed to commit code to a particular directory (or to the entire repository) without first obtaining approval from an owner of the particular directory. In some instances, these trusted users may be included in a whitelist file within the particular directory. In other instances, identifiers of these whitelisted users may be included in the ownership file. In response to receiving a request to commit code to the repository, the review enforcement system may determine a user's identifier based on the commit request. Next, the review enforcement system may compare the user's identifier against the identifiers of the whitelisted users for the particular directory. If the review enforcement system determines that the user's identifier is included among the identifiers of the whitelisted users, the user may be allowed to commit the code to the repository without first obtaining a review and approval of the code to be committed to the directory.

In various example embodiments, in addition to the requirement that at least one of the owners listed in the ownership file review and approve the code before the code is committed to a guarded directory, at least one of a second group of owners is required to review and approve the code before the code can be committed to the directory. In some instances, the second group of owners is included in a file called "release owner file". If a path has a release owner file associated with it, then at least one of the release owners identified in the release owner file is required to review and approve the code in addition to at least one regular owner identified in the regular ownership file being required to review and approve the code.

According to certain example embodiments, an ownership file may define one or more paths that may be excluded from the enforcement of the code review requirement. For example, a directory called "/path/to/guarded_dir" may include a plurality of subdirectories. Some of subdirectories may be guarded. To commit code to a guarded subdirectory, a user may be required to obtain review and approval of the code from an owner of the directory. Other subdirectories may be unguarded (e.g., "/path/to/guarded_dir/unguarded_dir"). To commit code to an unguarded subdirectory, a user may not be required to obtain review and approval of the code from the owner of the directory. The ownership file that specifies the owners of the "/path/to/guarded_dir" directory may specify, in a "paths" field, the "/path/to/guarded_dir" directory, and, in an "exclude paths" field, the "/path/to/guarded_dir/unguarded_dir" directory. Upon receiving a commit request to commit code to the repository, the review enforcement system may determine whether the destination directory for the code requested to be committed to the repository is a guarded subdirectory or an unguarded subdirectory. If the destination directory is a guarded subdirectory, the review enforcement system determines whether an owner listed in the ownership file associated with the destination directory reviewed and approved the code requested to be committed. If the destination directory is an unguarded directory, the review enforcement system commits the code to the unguarded subdirectory.

FIG. 1 is a network diagram depicting an example network environment 100 suitable for enforcing code reviews, according to some example embodiments. The network environment 100 includes a review enforcement system 102, a review system 103, a database 105, a source control system 106, all communicatively coupled to each other through a network 108. In some example embodiments, the database 105 may store ownership data (e.g., ownership files). In other example embodiments, the ownership data is stored within the source control system 106 (e.g., in a repository 107). As shown in FIG. 1, some or all of the review enforcement system 102, the review system 103, the database 105, and the source control system 106 may form all or part of a network-based system 101. Additional systems or databases may be included in the network-based system 101. For example, a ticket database 104 may be part of the review system 103 and a repository 107 may be part of the source control system 106. In some example embodiments, the ticket database 104 may store records pertaining to review tickets used during the review of the code. The repository 107, in some instances, may store the code that the owner 113 reviewed and approved to be committed to the repository 107. The review system 103 may manage the review tickets, for example, by opening and closing tickets, transmitting communications (e.g., alerts, notifications, email messages, reminders, etc.) that relate to reviewing of code to users of the review system 103, providing a review platform to facilitate the review and approval of code before the code may be committed to the repository 107, etc.

Also shown in FIG. 1 are a user's client device 109 and an owner's client device 110. The review enforcement system 102, the review system 103, the database 105, the source control system 106, the user's client device 109, and the owner's client device 110 may each be implemented in a computer system, in whole or in part, as described below with respect to FIG. 7.

Also shown in FIG. 1 are one or more user(s) 112 and one or more owner(s) 113. One or both of the user 112 and owner 113 may be a human being, a machine (e.g., a computer configured by a software program to interact with the user's client device 109 or the owner's client device 110), or any suitable combination thereof (e.g., a human assisted by a machine or a machine supervised by a human). The user 112 may be associated with the user's client device 109 and may be the user of the user's client device 109. For example, the user's client device 109 may be a desktop computer, a vehicle computer, a tablet, a portable media device, or a smart phone belonging to the user 112. Likewise, the owner 113 may be associated with the owner's client device 110 and may be the owner's client device 110, respectively. For example, the owner's client device 110 may be a desktop computer, a vehicle computer, a tablet, a portable media device, or a smart phone belonging to the owner 113. In some example embodiments, the user's client device 109 or the owner's client device 110 may communicate with (e.g., transmit a communication, transmit data, etc.) to one or more systems or databases included in the network-based system 101 via network 111. In certain example embodiments, the user's client device 109, the owner's client device 110, or both, are part of the network-based system 101. In various example embodiments, the user's client device 109, the owner's client device 110, or both, communicate with the review enforcement system 102, the review system 103, the database 105, or the source control system 106 via the network 108, and do not use the network 111 to communicate with the review enforcement system 102, the review system 103, the database 105, or the source control system 106.

Any of the machines, systems, databases, or client devices shown in FIG. 1 may be implemented in a general-purpose computer modified (e.g., configured or programmed) by software to be a special-purpose computer to perform the functions described herein for that machine, system, database, or client device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, systems, databases, or client devices illustrated in FIG. 1 may be combined into a single machine. Also, the functions described herein for any single machine, system, database, or client device may be subdivided among multiple machines, systems, databases, or client devices.

The network 108 and the network 111 may be any network that enables communication between or among machines, systems, databases, or client devices (e.g., the review enforcement system 102 and the owner's client device 110). Accordingly, the network 108 and the network 111 may be wired networks, wireless networks (e.g., mobile or cellular networks), or any suitable combination thereof. The network 108 and the network 111 may include one or more portions that constitute a private network, a public network (e.g., the Internet), or any suitable combination thereof.

Figure 2:
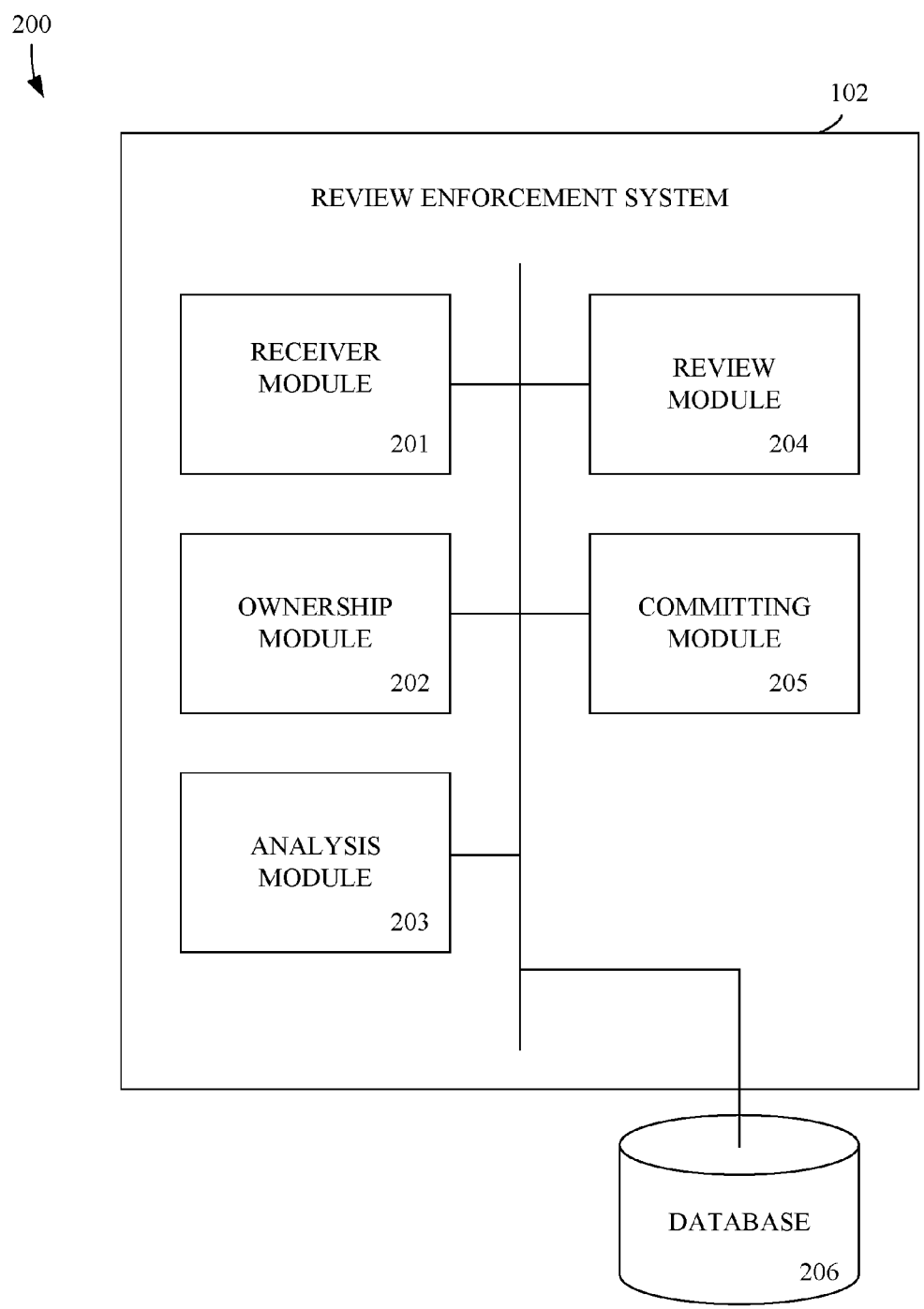
FIG. 2 is a block diagram of certain modules of an example review enforcement system, consistent with some example embodiments.

FIG. 2 is a block diagram of certain modules of an example review enforcement system, consistent with some example embodiments. Some or all of the modules of system 200 illustrated in FIG. 2 may be part of the review enforcement system 102. As such, system 200 is described by way of example with reference to FIG. 1.

The system 200 is shown to include a number of modules that may be in communication with each other. One or more modules of the system 200 may reside on a server, client, or other processing device. One or more modules of the system 200 may be implemented or executed using one or more hardware processors. In some example embodiments, one or more of the depicted modules are implemented on a server of the network-based system 101. In FIG. 2, the review enforcement system 102 is shown as including a receiver module 201, an ownership module 202, an analysis module 203, a review module 204, and a committing module 205 configured to communicate with each other (e.g., via a bus, shared memory, or a switch). Also shown in FIG. 2 is a database 206 configured to communicate with one or more modules of the review enforcement system 102.

The receiver module 201 is configured to receive a commit request to commit code to the repository 107. According to some example embodiments, the commit request is received from the user's client device 109 associated with the user 112. According to certain example embodiments, the commit request is received from the owner's client device 110 associated with the owner 113. In some example embodiments, the commit request references the code. In various example embodiments, the commit request includes the code.

According to certain example embodiments, the code includes a difference (e.g., a diff) between one or more upload files located in the directory and a further one or more upload files. The further one or more upload files may be a revision (or a new version) of the one or more upload files. The difference may indicate one or more changes made by a developer to the one or more upload files. For example, the code requested to be committed to the repository is the diff between the upload file previously checked into the directory and a further upload file that includes one or more changes made by the user 112 to address a problem with the upload file. The diff reflects the changes made by the user 112. According to another example, the code requested to be committed to the repository is a further upload file that is a revision of the upload file located in the directory. The further upload file includes the diff. The further upload file may or may not include additional content.

The ownership module 202 is configured to access ownership data (e.g., an ownership file in the repository 107). The ownership file includes a directory identifier of a directory of the repository 107, and an identifier of an owner who controls committing of code to the directory. The directory identifier may be a directory path that uniquely identifies a particular directory. A directory may or may not include any previously committed code (e.g., upload files). An identifier of an owner may be an alpha-numeric combination that establishes the identity of an owner. The review enforcement system 102 may enforce an owner's control over the committing of code to a particular directory by logically assigning the particular directory to the owner and by requesting that any code to be committed to the particular directory undergo the owner's review. Additionally, in order to be committed to the directory, the upload must be approved (by the owner) to be committed.

In certain example embodiments, the directory includes a first version of one or more upload files. The commit request may reference a further one or more upload files. The further one or more upload files referenced in the commit request may be a revision of the first version (e.g., a second version) of the one or more upload files located in the directory. The revision may include a change to the one or more upload files. In certain example embodiments, the revision includes a difference between the first version of the one or more upload files and a second version of the one or more upload files. In some instances, the first version of a file located in the repository 107 may also be known as a "first revision", and the revision of the first version may also be known as a "second revision".

In some example embodiments, the ownership file includes one or more owners. In other example embodiments, the ownership file includes a plurality of owners (e.g., at least two owners). Unless a particular owner is requested (e.g., by the user 112 or automatically by the review enforcement system 102) to review the code (e.g., a diff or an upload file), any of the plurality of owners may review the code.

In certain example embodiments, the owner is an author of the code who created at least a portion of the code. In order to enforce a requirement that the code is reviewed by an owner before the code is committed to the repository 107, the review enforcement system 102 may request that the ownership file include at least two owners. One owner of the at least two owners may review the code that the other owner of the at least two owners requested to be committed to the repository 107, and vice versa.

In some example embodiments, the ownership module 201 receives a request to create the ownership file. The request to create the ownership file may be received from a further client device (e.g., the owner's client device 110). The further client device may be associated with the owner 113. The ownership module 201 determines, based on the request to create the ownership file, that the request to create the ownership file specifies the owner 113 as a sole owner to be included in the ownership file. Based on determining that the request to create the ownership file specifies the owner 113 as a sole owner to be included in the ownership file, the ownership module 201 transmits a communication to the further client device. The communication may include a request that the owner specify an additional owner to be included in the ownership file.

In some example embodiments, the owners of a particular directory may be specified in a plurality of ownership files. Then, the code requested to be checked into the particular directory may be reviewed by an owner of the union of owners specified in the plurality of ownership files.

According to certain example embodiments, certain users may be allowed to commit code to a particular directory (or the entire repository 107) without first obtaining approval from the owners of the particular directory. These trusted users may be included in a whitelist file within the particular directory. In response to receiving a request to commit code to the repository, the review enforcement system 102 may determine a user's identifier based on the commit request (e.g., based on metadata that pertains to the commit request, based on the user's client device associated with the user, etc.) Next, the review enforcement system 102 may verify the user's identifier against the identifiers of the whitelisted users included in the whitelist file. If the review enforcement system 102 determines that the user's identifier is included in the whitelist file, the user may be allowed to commit the code to the repository 107 even if the user did not obtain a review and approval of the code to be committed to the repository 107.

In various example embodiments, in addition to the requirement that at least one of the owners listed in the ownership file review and approve the code before the code is committed to a guarded directory, at least one of a second group of owners is required to review and approve the code before the code can be committed to the directory. In some instances, the second group of owners is included in a file called "release owner file". If a path has a release owner file associated with it, then at least one of the release owners identified in the release owner file is required to review and approve the code in addition to at least one regular owner identified in the regular ownership file.

The analysis module 203 is configured to determine, based on the ownership file, whether an owner provided an indication of approval of the code requested to be committed to the repository 107. In various example embodiments, in order to determine whether an owner provided an indication of approval of the code, the analysis module 203 determines a code identifier (e.g., a diff identifier, an upload file identifier, etc.) based on the commit request; determines, based on the code identifier, that the directory is a destination of the code; and identifies, based on the directory being the destination of the code, the ownership file which specifies one or more owners who guard the destination directory. Based on the ownership file (e.g., on the data included in the ownership file), the analysis module 203 may determine that no owner specified in the ownership file reviewed the code. Alternatively, based on the ownership file (e.g., on the data included in the ownership file), the analysis module 203 may determine that an owner (e.g., the owner 113) reviewed the code and that a communication was transmitted to the user. The communication may include a request to modify the code.

In some instances, if the analysis module 203 determines that an owner 113 of one or more owners identified in the ownership file approved the code to be committed, the review enforcement system 102 may allow the code to be committed to the destination directory. In certain example embodiments, the analysis module 203 determines that the owner 113 approved the code to be committed to the repository 107 based on the indication of approval being received from the owner's client device 110 associated with the owner 113.

In other instances, if the analysis module 203 determines that no indication of approval of the code was received from any of the owners guarding the destination directory (e.g., from the owner's client device 110 associated with the owner 113), the review enforcement system may reject the commit request. The review enforcement system 102 may request that the user 112 obtain an owner's permission to commit the code.

In some example embodiments, the ownership file includes a plurality of owners, including the owner 113 and a further owner. The analysis module 203 may determine that the user who requested to commit the code is the owner 113. Based on the determining that the user is the owner 113, the analysis module 203 may request that the owner 113 have the code reviewed by another owner. For example, analysis module 203 may transmit a communication to the client device of the user (in this case, the owner 113). The communication may include a request that the user obtain a review of the code from the further owner.

The review module 204 is configured to facilitate, based on the determination that the owner 113 did not provide the indication of approval, a review of the code (e.g., by the owner 113). The review module 204 is further configured to receive (e.g., from the owner's client device 110 associated with the owner 113) the indication of approval of the code.

Consistent with some example embodiments, the review enforcement system 102 verifies that the indication of approval was provided by an owner authorized to provide approval for code to be committed to a directory of the repository 107. In some example embodiments, upon the review module 204 receiving the indication of approval of the code, the analysis module 203 accesses approval data that pertains to the indication of approval of the code (e.g., ticket data 104 that is included in a review ticket associated with the commit request and managed by the review system 103). The analysis module 203 determines, based on the approval data, an approval grantor identifier of a person who indicated the approval of the code. The analysis module 203 identifies, based on a code identifier (e.g., an upload file name) included in the commit request, the ownership file and determines an owner identifier of the owner based on the ownership file. The analysis module 203 then may or may not match the approval grantor identifier and the owner identifier. If the approval grantor identifier and the owner identifier are matched, the user is allowed to commit the code to the respective destination directory.

The owner 113 may provide the indication of approval upon reviewing the code. In some example embodiments, the owner 113 may review the code via a review user interface (UI) displayed on the owner's client device 110. The review UI may be generated by the review system 103 to assist the owner 113 in reviewing the code. In some example embodiments, in order to assist the review process, the review module 204 opens a particular review ticket (e.g., associated with the commit request) in the review system 103, and requests that the owner 113 review the code using the particular review ticket. The owner 113 may review the code using the particular review ticket, in some instances, by interacting with the review UI. Some or all of the data that pertains to the review of the code may be stored in a record of the review ticket database 104 in association with a review ticket identifier of the particular review ticket.

According to some example embodiments, the review enforcement system 102 verifies that the code requested by the user 112 to be committed to the repository 107 is the same code that the owner 113 reviewed and approved. In some example embodiments, the review module 204 is further configured to access the code based on the reference to the code in the commit request, and to transmit a communication to a client device associated with the owner. The communication may include a reference to the code and a request to the owner to review the code. The review module 204 receives an indication that the owner reviewed and approved the code. The indication may be received from the client device associated with the owner. The review module 204 may transmit a further communication to the client device associated with the user. The communication may include the indication of approval of the code. The receiver module 201 may receive a further commit request from the client device associated with the user. The further commit request may reference further code. The review module 204 may access the further code based on the reference to the further code in the further commit request and may or may not match the code and the further code. Based on matching the code and the further code, the committing module 205, described in more detail below, commits the further code to the directory in response to the receiving of the further commit request.

In certain example embodiments, the analysis module 203 described above is further configured to determine, based on the determination that the owner 113 did not provide the indication of approval of the code, that the owner 113 did not review the code. For example, the analysis module 203 communicates with the review system 103 and determines that no ticket associated with the particular commit request (or with the particular code) was opened. Based on the determination that no ticket associated with the particular commit request (or with the particular code) was opened, the analysis module 203 may determine (e.g., conclude, imply, etc.) that the owner did not review the code. The review module 204 may then open a review ticket associated with the particular commit request (or with the particular code) and may transmit a communication to the owner 113. The communication may reference the review ticket and may include a request to review the code. The owner 113 may review the code and may provide approval of the code to be committed to the directory guarded by the owner 113. Alternatively, the owner 113 may request that the user 112 make certain changes to the code based on feedback (e.g., a comment) provided by the owner 113.

In various example embodiments, the analysis module 203 described above is further configured to determine, based on the determination that the owner 113 did not provide the indication of approval of the code, that the owner 113 reviewed the code and requested that the user 112 modify the code. For example, based on the determination that the owner 113 did not provide the indication of approval of the code, the review module 204 transmits a first communication to the owner's client device 110 in which the owner 113 is requested to review the code. The first communication may include the code or a reference to a location where the owner 113 may access the code. In response to the first communication, the review module 204 receives a second communication from the owner's client device 110. The second communication may include feedback based on the code. Based on determining that the second communication includes feedback, the review module 204 transmits a third communication to the user's client device 109 in which the user 112 is requested to modify the code based on the feedback received from the owner 113. The third communication may include the feedback or a reference to a location where the user 112 may access the feedback. In response to the third communication, the review module 204 may receive modified code from the user's client device 109. The review module 204, based on receiving the modified code, transmits a fourth communication to the owner's client device 110. The fourth communication may include the modified code or a reference to a location where the owner 113 may access the modified code. In response to the fourth communication, the review module 204 may receive an indication of approval of the modified code to be committed to the directory controlled by the owner 113.

The committing module 205 is configured to commit the code to the directory based on the indication of approval of the code. The committing module 205 is further configured to commit the code to a destination directory based on the review enforcement system 102 determining that the code is committable without an indication of approval from an owner who guards the destination directory.

For example, the receiver module 201 receives a further commit request to commit further code to the repository 107. The commit request is received from a further user. The ownership module 202 is further configured to access a whitelist file in the repository 107. The whitelist file may include an identifier of the further user who is allowed to commit the code to the repository 107 without obtaining approval of the code from the owner. Based on the whitelist file, the analysis module 203 determines that the further code is committable (e.g., may be committed) to the repository 107 without an approval from the owner. The committing module 205 commits the code to the destination directory based on the determination that the further code may be committed to the repository 107 without an approval from the owner.

In some example embodiments, the ownership module 202 is further configured to access a further ownership file in the repository 107. The further ownership file may include a further directory identifier of the directory, and an identifier of a further owner who, like the owner, also controls the committing of code to the directory. The receiving of the indication of approval of the code by the review module 204 includes determining that at least one owner of a union of the owner and of the further owner reviewed the code and provided the indication of approval of the code. For example, either the owner, or the further owner, or both, reviewed the code and provided an indication of approval of the code. Based on the determination that at least one owner of a union of the owner and of the further owner reviewed the code and provided the indication of approval, the committing module 205 commits the code to the directory based on the indication of approval of the code.

In some example embodiments, the ownership module 202 is further configured to access a further ownership file (e.g., a release owner file discussed above) in the repository 107. The further ownership file may include a further directory identifier of the directory, and an identifier of a further owner who controls the committing of code to the directory. The receiving of the indication of approval of the code by the review module 204 includes determining that the owner reviewed the code and provided the indication of approval of the code, and that the further owner reviewed the code and provided a further indication of approval of the code. Based on the determination that both the owner and the further owner reviewed and approved the code by providing the indication of approval and the further indication of approval, respectively, the committing module 205 commits the code to the directory.

In some example embodiments, the committing of the code to the directory includes determining that the directory is a trunk directory of the repository 107; determining that the trunk directory is unlocked; and committing the code to the trunk directory.

In certain example embodiments, the committing of the code to the directory includes determining that the directory is a trunk directory of the repository 107; determining that the trunk directory is locked, the locking occurring in response to detecting that the trunk directory is unstable; determining that the change included in the code is intended to stabilize the trunk directory; and committing the code to the trunk directory.

For example, the review enforcement system 102 may lock the trunk directory because the code became unstable in some way. The review enforcement system 102 may receive a commit request from a user, and may detect that a specific flag was used to indicate that the revision requested to be checked-in is a change intended to stabilize the trunk directory. Based on detecting the specific flag, the review enforcement system 102 may allow the user's revision to be checked into the trunk directory. One or more tests (e.g., an integration test, a functional test, a UI test, a language test, etc.) may be performed on the checked-in revision. A successfully tested revision may be deemed stable and may be deployed.

Figure 3:
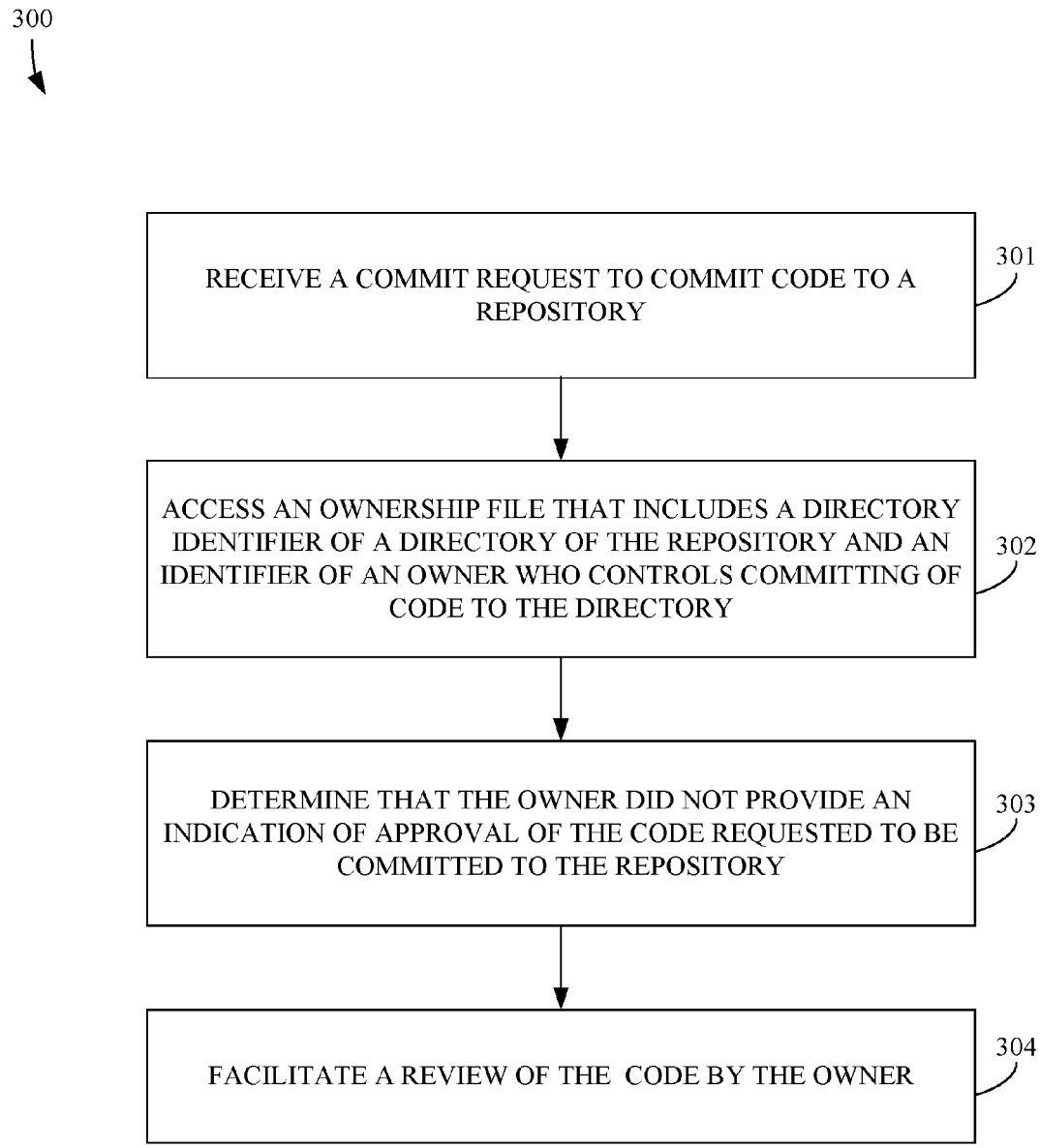
FIG. 3 is a flowchart diagram illustrating method steps of an example method for enforcing a code review, consistent with some example embodiments.

FIG. 3 is a flowchart diagram illustrating method steps of an example method 300 for enforcing a software code review, consistent with some example embodiments. The inventive subject matter may be implemented for use with applications that utilize any of a variety of network or computing models, to include web-based applications, client-server applications, or even peer-to-peer applications.

Consistent with some example embodiments, the method begins at method operation 301, when the receiver module 201 receives a commit request to commit code to the repository 107. The commit request may be received from a client device. The commit request may reference the code. The client device may be associated with a user.

At method operation 302, the ownership module 202, in response to the receiving of the commit request, accesses an ownership file in the repository 107 based on the commit request. The ownership file includes a directory identifier of a directory of the repository 107 and an identifier of an owner who controls the committing (e.g., by others) of code to the directory.

At method operation 303, the analysis module 203 determines, based on the ownership file, that the owner did not provide an indication of approval of the code requested (e.g., by the user) to be committed to the repository 107.

Next, at method operation 304, the review module 304 facilitates, based on the determination that the owner did not provide the indication of approval, a review of the code by the owner.

Figure 4:
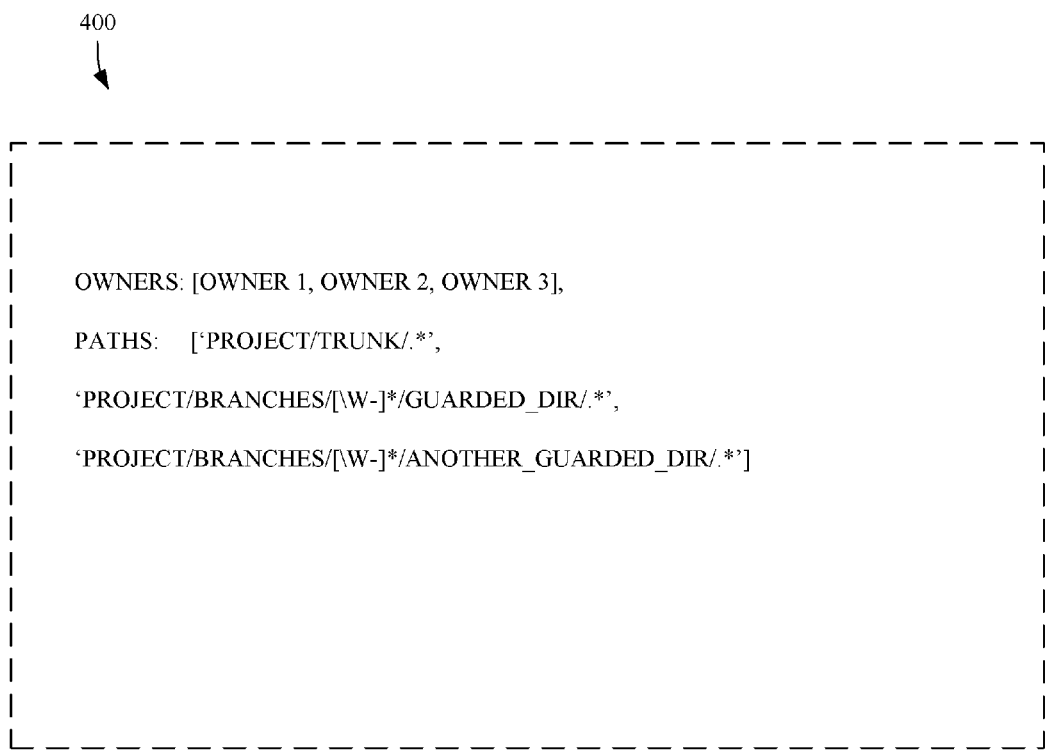
FIG. 4 is an example ownership file, consistent with some example embodiments.

FIG. 4 is an example ownership file, consistent with some example embodiments. As shown in FIG. 4, the ownership file includes a plurality of owners (e.g., owner 1, owner 2, and owner 3). More or fewer owners may be included in the ownership file. The ownership file also includes a plurality of paths or directories (e.g., 'PROJECT/TRUNK/.*', 'PROJECT/BRANCHES/[\W-]*/GUARDED_DIR/.*', 'PROJECT/BRANCHES/[\W-]*/ANOTHER_ GUARDED_ DIR/.*'). More or fewer paths may be included in the ownership file. For example, as described above, one or more paths that are excluded from the requirement of code review may be specified in the ownership file.

The owners guard the directories specified in the ownership file. For example, each owner specified in the ownership file is authorized to control the committing by others of code to the directory by reviewing the code and rejecting or approving the code to be committed to one of the guarded paths. In some example embodiments, a review and approval by one of the plurality of owners specified in the ownership file is sufficient for committing the code. In certain example embodiments, as discussed above, a plurality of owners (e.g., specified in the same ownership file or in different ownership files) are required to review and approve the code before the code can be committed to the repository 107.

Figure 5:
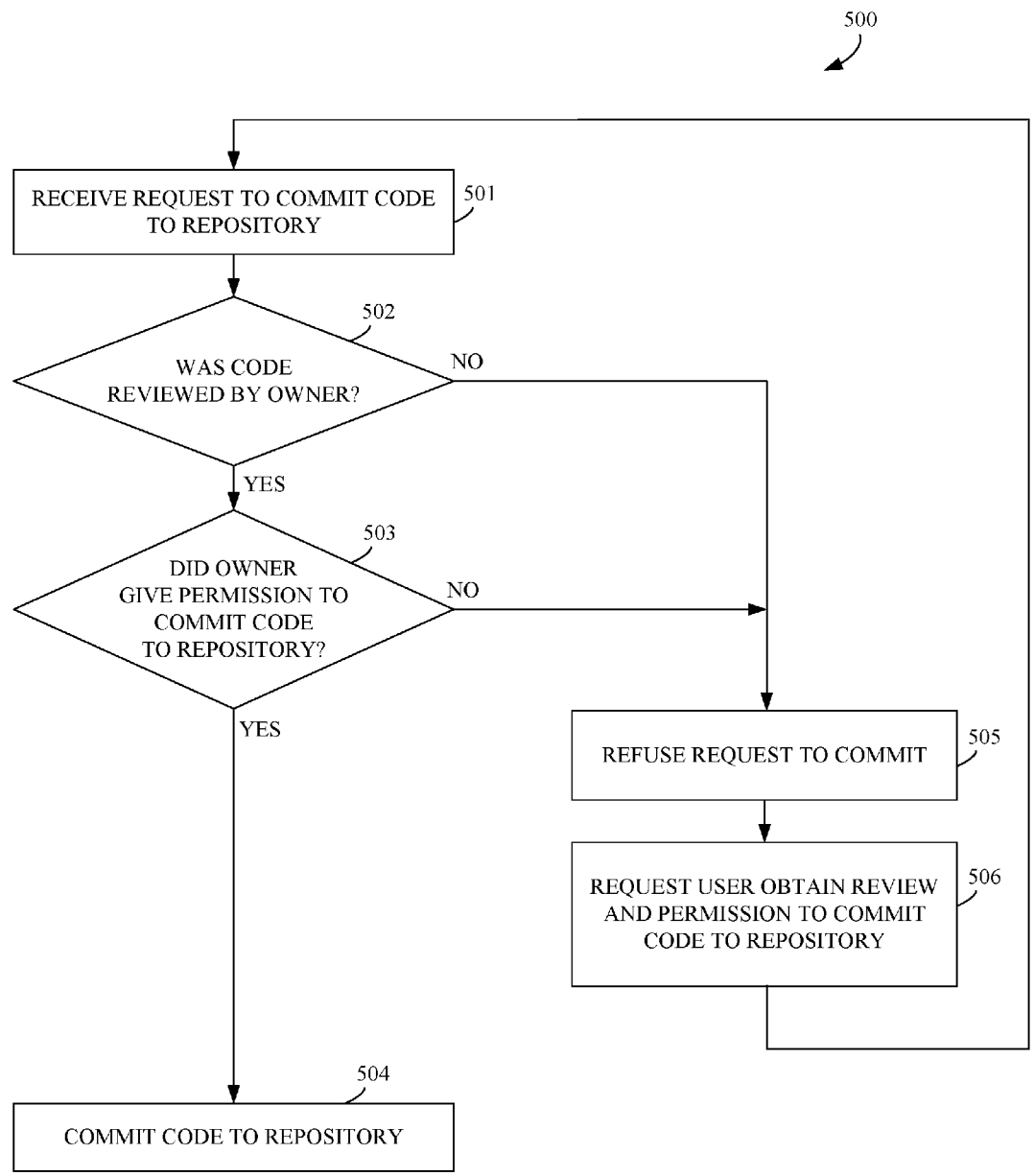
FIG. 5 is a flowchart diagram illustrating method steps of an example method for enforcing a code review, consistent with some example embodiments.

FIG. 5 is a flowchart diagram illustrating method steps of an example method for enforcing a software code review, consistent with some example embodiments. In some example embodiments, the method 500 begins at method operation 501, when the receiver module 201 receives a commit request from a client device to commit code to the repository 107.

At method operation 502, the analysis module 203 determines, using the ownership data identified based on the commit request, whether the code was reviewed by the owner. In some instances, additional data may be used to determine whether the code was reviewed by the owner. The additional data may be included in a review ticket associated with the commit request, the code, the user, the owner, or a suitable combination thereof. The additional data may be located in the review system 103 (e.g., stored as a record in the ticket database 104). If the analysis module 203 determines that the code was reviewed by the owner, then, at method operation 503, the analysis module 203 determines whether the owner gave permission to commit the code to the repository 107. If the analysis module 203 determines that the owner gave permission to upload the file to the repository 107, at method operation 504, the committing module 205 commits the code to the repository 107.

If, at method operation 502, the analysis module 203 determines that the code was not reviewed by the owner (or by another owner authorized to review the code), the analysis module 203 may, at method operation 505, refuse the request to commit the code to the repository 107. Further, if, at method operation 503, the analysis module 203 determines that the owner did not give permission to commit the code to the repository 107, the analysis module 203 requests the user to obtain a review of the code and permission to commit the code to the repository 107 from the owner. Upon obtaining permission to commit the code to the repository 107 from the owner, the user may issue a further request to commit the code to the repository 107. The further commit request may be received by the receiver module 201 at method operation 501.

Figure 6:
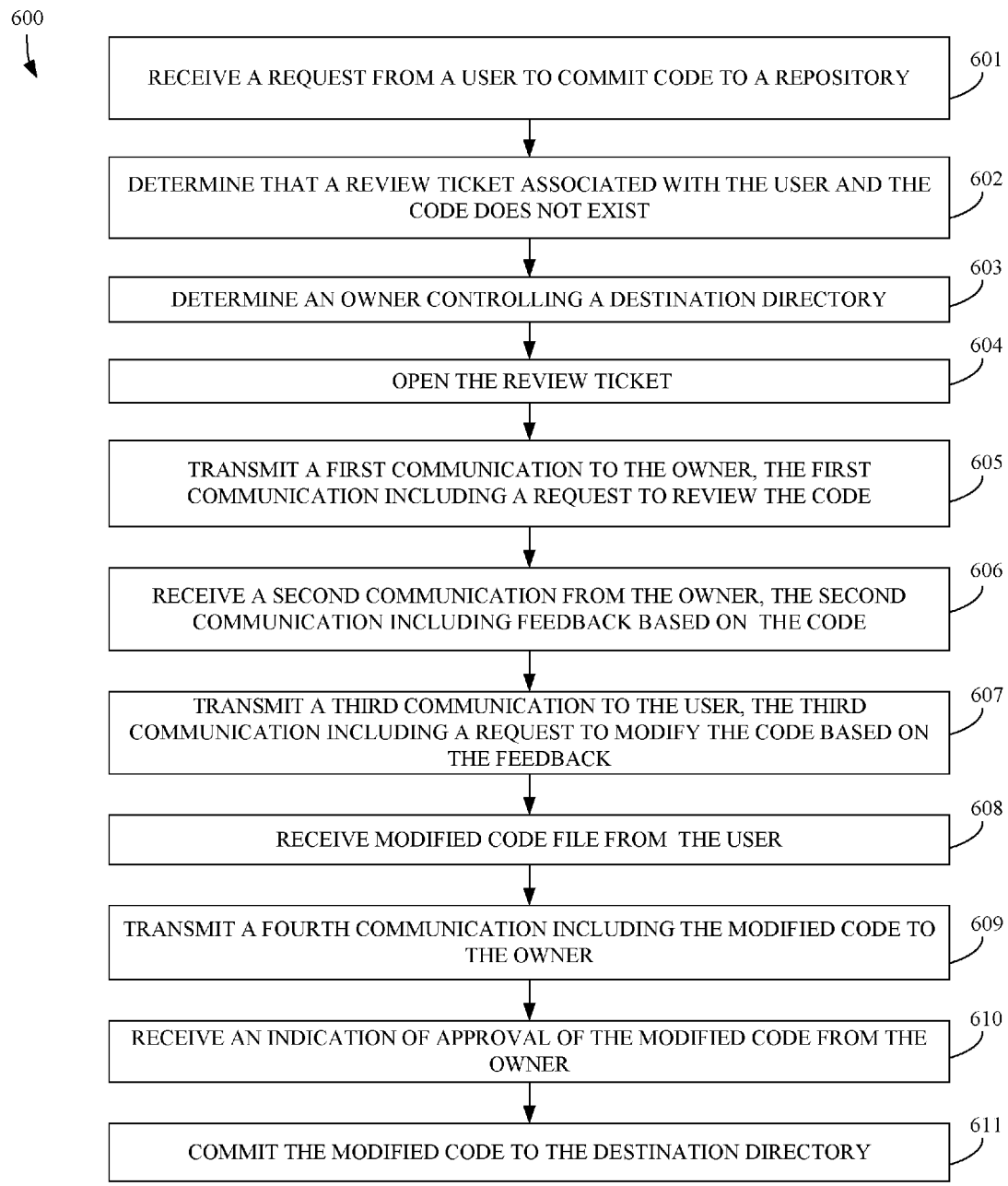
FIG. 6 is a flowchart diagram illustrating method steps of an example method for enforcing a code review, consistent with some example embodiments.

FIG. 6 is a flowchart diagram illustrating method steps of an example method for enforcing a software code review, consistent with some example embodiments. In some example embodiments, the method 600 begins at method operation 601, when the receiver module 201 receives a commit request from a client device to commit code to the repository 107.

At method operation 602, the review module 204 determines that a review ticket associated with the user and with the code does not exist. In some example embodiments, the review module 204 identifies, at method operation 603, an owner 113 controlling the destination directory based on the commit request. The review module 204 opens, at method operation 604, the review ticket associated with the user, the commit request, the owner(s), or a suitable combination thereof.

Next, at method operation 605, the review module 204 transmits a first communication to the owner's client device 110 in which the owner 113 is requested to review the code. The first communication may include the code or a reference to a location where the owner 113 may access the code. The first communication (and any further communication(s)) may be associated with the review ticket opened at method operation 604. For example, the review module 204 may keep track of one or more communications that pertain to the review ticket. Further, the review module 204 may request that the review system 103 generate a review UI and display the communications that pertain to the review ticket within the review UI presented to the user, the owner, another user or owner, or a suitable combination thereof.

At method operation 606, the review module 204 receives, in response to the first communication, a second communication from the owner's client device 110. The second communication may include feedback based on the code. Based on determining that the second communication includes feedback, the review module 204 transmits, at method operation 607, a third communication to the user's client device 109 in which the user 112 is requested to modify the code based on the feedback received from the owner 113. The third communication may include the feedback or a reference to a location where the user 112 may access the feedback.

In response to the third communication, the review module 204 may receive, at method operation 608, modified code from the user's client device 109. The review module 204, based on receiving the modified code, transmits, at method operation 609, a fourth communication to the owner's client device 110. The fourth communication may include the modified code or a reference to a location where the owner 113 may access the modified code. In response to the fourth communication, the review module 204 may receive, at method operation 610, an indication of approval of the modified code to be committed to the directory controlled by the owner 113. At method operation 611, the committing module 205 commits the modified code to the destination directory based on the indication of approval of the modified code.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules or objects referred to herein may, in some example embodiments, comprise processor-implemented modules and/or objects.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
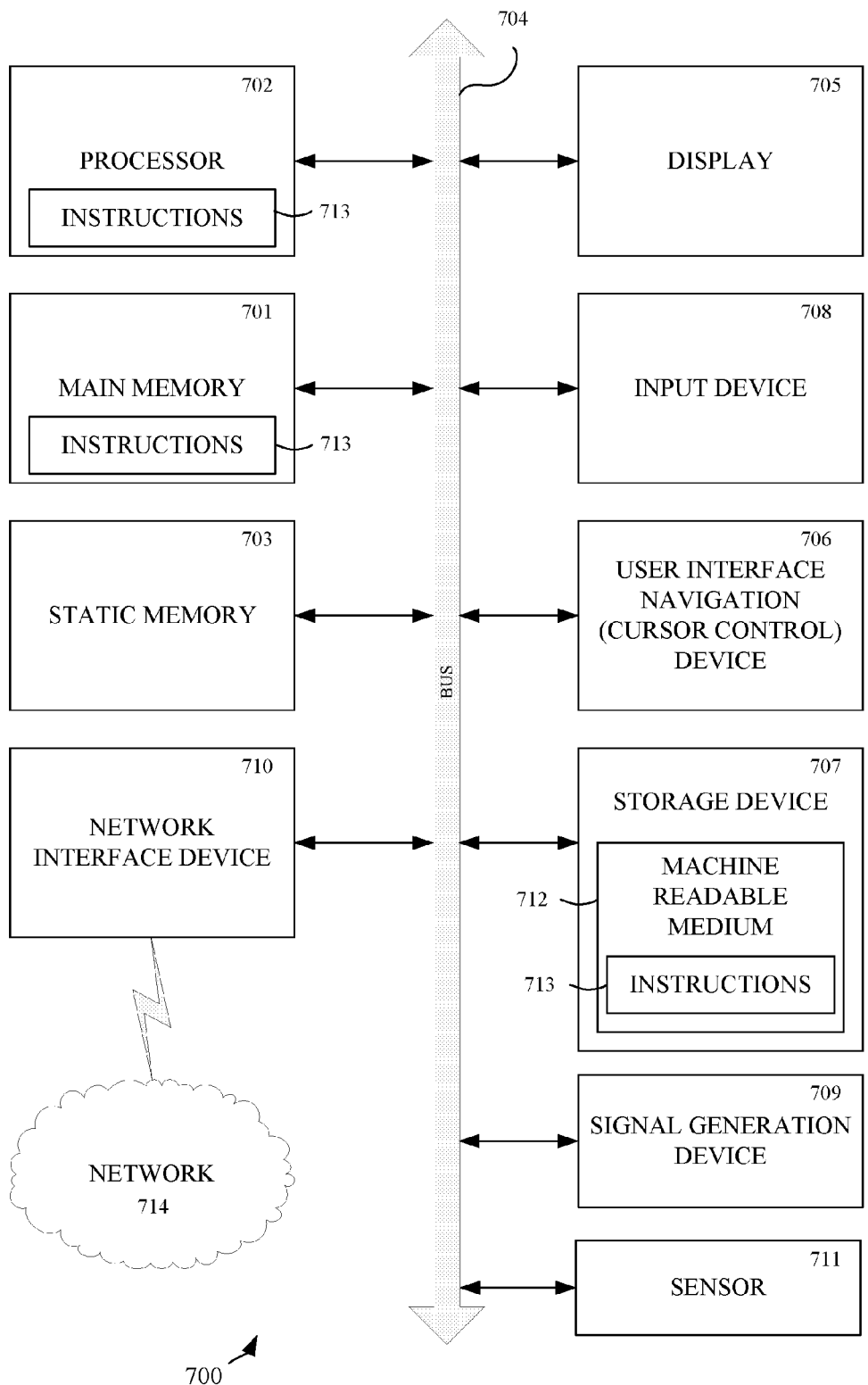
FIG. 7 is a block diagram of a machine in the example form of a computer system within which a set of instructions, for causing the machine to perform any one or more of the methodologies discussed herein, may be executed.

FIG. 7 is a block diagram of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 701 and a static memory 703, which communicate with each other via a bus 704. The computer system 700 may further include a video display unit 705 (e.g., a liquid crystal display (LCD) or a cathode ray tube (CRT)). The computer system 700 also includes an alphanumeric input device 708 (e.g., a keyboard or a touch-sensitive display screen), a user interface (UI) navigation device 706 (e.g., a mouse). The computer system 700 may additionally include a storage device 707 (e.g., drive unit), a signal generation device 709 (e.g., a speaker), a network interface device 710, and one or more sensors 711, such as a global positioning system sensor, compass, accelerometer, or other sensor.

Machine-Readable Medium

The drive unit 707 includes a machine-readable medium 712 on which is stored one or more sets of instructions and data structures (e.g., software 713) embodying or utilized by any one or more of the methodologies or functions described herein. The instructions 713 may also reside, completely or at least partially, within the main memory 701 and/or within the processor 702 during execution thereof by the computer system 700, the main memory 701 and the processor 702 also constituting machine-readable media.

While the machine-readable medium 712 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 713 may further be transmitted or received over a communications network 714 using a transmission medium. The instructions 713 may be transmitted using the network interface device 710 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi® and WiMax® networks). The term "transmission medium" shall be taken to include any intangible medium that is capable of storing, encoding or carrying instructions for execution by the machine, and includes digital or analog communications signals or other intangible media to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
a non-transitory machine-readable medium for storing instructions that, when executed by one or more hardware processors of a machine, cause the machine to perform operations comprising:
receiving a commit request to commit a particular code to a repository, the repository including one or more directories;
tracking receipt of one or more indications of approval, by one or more owners who control committing of code to the one or more directories of the repository, for one or more instances of code to be committed to the repository;
determining a directory of the one or more directories that is a destination of the particular code;
determining, based on an ownership file that identifies the directory, an owner who controls committing of the particular code to the directory;
determining, based on the tracking of the receipt of the one or more indications of approval that the owner who controls the committing of the code to the directory did not provide an indication of approval of the particular code to be committed to the repository; and
facilitating, based on the determination that the owner did not provide the indication of approval, a review of the particular code by the owner.

2. The system of claim 1, wherein the operations further comprise:
determining a code identifier based on the commit request,
wherein the determining of the directory that is the destination of the code is based on the code identifier.

3. The system of claim 1, wherein the operations further comprise:
receiving the indication of approval of the code.

4. The system of claim 3, wherein the operations further comprise:
committing the code to the directory based on the indication of approval of the code.

5. The system of claim 1, wherein the code includes a difference between one or more upload files located in the directory and a further one or more upload files.

6. The system of claim 5, wherein the further one or more upload files are a revision of the one or more upload files, and
wherein the difference indicates a change made to the one or more upload files.

7. A computer-implemented method comprising:
receiving a commit request to commit a particular code to a repository, the repository including one or more directories;
tracking receipt of one or more indications of approval, by one or more owners who control committing of code to the one or more directories of the repository, for one or more instances of code to be committed to the repository;
determining a directory of the one or more directories that is a destination of the particular code;
determining, based on an ownership file that identifies the directory, an owner who controls committing of the particular code to the directory;
determining, based on the tracking of the receipt of the one or more indications of approval that the owner who controls the committing of the code to the directory did not provide an indication of approval of the particular code to be committed to the repository; and
facilitating, based on the determination that the owner did not provide the indication of approval, a review of the particular code by the owner.

8. The computer-implemented method of claim 7, further comprising:
determining, based on the ownership file, that the owner reviewed the code and that a communication was transmitted to a user who issued the commit request, the communication including a request to modify the code.

9. The computer-implemented method of claim 7, further comprising:
receiving a further commit request to commit further code to the repository, the commit request being received from a client device associated with a user;
accessing a whitelist file in the repository, the whitelist file including an identifier of each one or more users who are allowed to commit code to the repository without obtaining approval of the code from the owner;
based on the whitelist file, determining that the user associated with the client device is one of the one or more users; and
committing the further code to the directory based on the determination that the user associated with the client device is one of the one or more users.

10. The computer-implemented method of claim 7, wherein the commit request is received from a client device associated with a user, and
wherein the ownership file includes a plurality of identifiers of a plurality of owners, including the owner and a further owner, the computer-implemented method further comprising:
determining that the user is the owner; and
transmitting, based on the determining that the user is the owner, a communication to the client device, the communication including a request that the user obtain a review of the code from the further owner.

11. The computer-implemented method of claim 7, further comprising:

receiving a request from a further client device to create the ownership file, the further client device being associated with the owner;

determining, based on the request to create the ownership file, that the request to create the ownership file specifies the owner as a sole owner to be included in the ownership file; and transmitting, based on the determining, a communication to the further client device, the communication including a request that the owner specify an additional owner to be included in the ownership file.

12. The computer-implemented method of claim 7, further comprising:

receiving the indication of approval of the code.

13. The computer-implemented method of claim 12, further comprising:

accessing a further ownership file in the repository, the further ownership file including an identifier of a further owner who controls the committing of code to the directory, wherein the receiving of the indication of approval of the code includes determining that at least one owner of a union of the owner and of the further owner reviewed the code and provided the indication of approval of the code.

14. The computer-implemented method of claim 12, further comprising:

accessing approval data that pertains to the indication of approval of the code;

determining, based on the approval data, an approval grantor identifier of a person who indicated the approval of the code;

identifying, based on the commit request, the ownership file;

determining an owner identifier of the owner based on the ownership file; and matching the approval grantor identifier and the owner identifier.

15. The computer-implemented method of claim 12, further comprising:

accessing a further ownership file in the repository, the further ownership file including an identifier of a further owner who controls the committing of code to the directory, wherein the receiving the indication of approval of the code includes determining that the owner reviewed the code and provided the indication of approval of the code, and that the further owner reviewed the code and provided a further indication of approval of the code.

16. The computer-implemented method of claim 7, further comprising:

committing the code to the directory of the repository based on the indication of approval of the code.

17. The computer-implemented method of claim 16, wherein the committing the code to the directory includes:

determining that the directory is a trunk directory of the repository;

determining that the trunk directory is unlocked; and committing the code to the trunk directory.

18. The computer-implemented method of claim 16, wherein the committing the code to the directory includes:

determining that the directory is a trunk directory of the repository;

determining that the trunk directory is locked, the locking occurring in response to detecting that the trunk directory is unstable;

determining that a change included in the code is intended to stabilize the trunk directory; and committing the code to the trunk directory.

19. The computer-implemented method of claim 7, wherein the facilitating the review of the code includes:

accessing the code based on a reference to the code in the commit request;

transmitting a communication to a client device associated with the owner, the communication including a reference to the code and a request to the owner to review the code;

receiving an indication that the owner reviewed and approved the code, the indication being received from the client device associated with the owner; and transmitting a further communication to a client device associated with a user, the communication including the indication of approval of the code, the computer-implemented method further comprising:

receiving a further commit request from the client device associated with the user, the further commit request referencing further code;

accessing the further code based on the reference to the further code in the further commit request;

matching the code and the further code; and committing, based on the matching, the further code to the directory in response to the receiving of the further commit request.

20. A non-transitory machine-readable storage medium comprising instructions that when executed by one or more hardware processors of a machine, cause the machine to perform operations comprising:

receiving a commit a particular request to commit code to a repository, the repository including one or more directories;

tracking receipt of one or more indications of approval, by one or more owners who control committing of code to the one or more directories of the repository, for one or more instances of code to be committed to the repository;

determining a directory of the one or more directories that is a destination of the particular code;

determining, based on an ownership file that identifies the directory, an owner who controls committing of the particular code to the directory;

determining, based on the tracking of the receipt of the one or more indications of approval that the owner who controls the committing of the code to the directory did not provide an indication of approval of the particular code to be committed to the repository; and facilitating, based on the determination that the owner did not provide the indication of approval, a review of the particular code by the owner.

* * * * *